United States Patent
Hwang

[11] Patent Number: 6,122,004
[45] Date of Patent: *Sep. 19, 2000

[54] IMAGE STABILIZING CIRCUIT FOR A CAMCORDER

[75] Inventor: Jung-Hyun Hwang, Seoul, Rep. of Korea

[73] Assignee: Samsung Electronics Co., Ltd., Kyungki-do, Rep. of Korea

[ * ] Notice: This patent issued on a continued prosecution application filed under 37 CFR 1.53(d), and is subject to the twenty year patent term provisions of 35 U.S.C. 154(a)(2).

[21] Appl. No.: 08/777,378

[22] Filed: Dec. 27, 1996

[30] Foreign Application Priority Data

Dec. 28, 1995 [KR] Rep. of Korea ........................ 95-61860

[51] Int. Cl.[7] ................................................. H04N 5/228
[52] U.S. Cl. ............................................................ 348/208
[58] Field of Search ................................... 348/208, 154, 348/155

[56] References Cited

U.S. PATENT DOCUMENTS

| | | | |
|---|---|---|---|
| 5,099,323 | 3/1992 | Morimura et al. | 358/105 |
| 5,497,191 | 3/1996 | Yoo et al. | 348/208 |
| 5,526,044 | 6/1996 | Tokumitsu et al. | 348/208 |
| 5,596,365 | 1/1997 | Erickson et al. | 348/208 |
| 5,617,138 | 4/1997 | Ito et al. | 348/222 |
| 5,629,988 | 5/1997 | Burt et al. | 382/276 |
| 5,691,471 | 11/1997 | Okazaki et al. | 73/504.041 |
| 5,796,427 | 8/1998 | Suzuki | 348/208 |
| 5,995,141 | 11/1999 | Hieda | 348/208 |
| 6,047,134 | 4/2000 | Sekine et al. | 348/208 |
| 6,049,354 | 4/2000 | Sekine et al. | 348/208 |

*Primary Examiner*—Wendy Garber
*Assistant Examiner*—Jacqueline Wilson
*Attorney, Agent, or Firm*—Sughrue, Mion, Zinn, Macpeak & Seas, PLLC

[57] ABSTRACT

An image stabilizing circuit, capable of stabilizing unstable images, which are produced by hand-trembling of a user recording images with the camcorder, is provided. The image stabilizing circuit comprises a CCD, a second buffer, a motion detector, an image shifting element, a first buffer and an image adding element. The CCD receives light signals from objects, and produces image signals corresponding to the light signals. The second buffer temporarily stores the input image signals for shifting the image signal. The motion detector is provided for analyzing the input image signals to detect the trembling motion of the input images. The image shifting element shifts a frame of an image stored in the first buffer according to an output of the motion detector, and thereby produces a shifted frame comprising a shifted portion of the input image and a remaining portion with no image. The first buffer is provided for storing previous image signals of the second buffer. Finally, the image adding element is used for adding the shifted portion of the image and a portion of the previous image stored in the second buffer, wherein the portion stored in the second buffer corresponds to the remaining portion of the shifted frame, and for producing output images.

12 Claims, 3 Drawing Sheets

IMAGE STABILIZING CIRCUIT FOR A CAMCORDER

BACKGROUND OF THE INVENTION (1) Field of the Invention

The present invention relates to an image stabilizing circuit for a camcorder, and more particularly, to an image stabilizing circuit for a camcorder which stabilizes unstable images, which are produced by hand-trembling when a user is recording the images with the camcorder.

(2) Description of the Prior Art

Currently, camcorders and portable cameras having a video cassette recorder (VCR) are widely used as portable devices for recording moving pictures. However, when a user records the images with a camcorder, especially while the user is walking or in a moving vehicle, unstable and trembling images are recorded due to the user's hand-trembling. The trembling is a serious disadvantage when the user is recording the images with a high magnification ratio. Therefore, various image compensation circuits or devices have been developed to eliminate these disadvantages. For instance, an improved charge coupled device (CCD) or a buffer having large memory size is used for the compensation of the trembling images. For an example, a Japanese cooperation, SONY, developed a method to control a beam axis of the input beam with an active prism. Hereinafter, conventional image stabilizing circuits and devices will be described in detail with reference to the attached drawings.

FIG. 1 illustrates the conventional method of stabilizing the recorded unstable image by using a buffer having a large memory size, in which the input image is temporarily stored. In this method, the system reproduces the input image from the buffer, in a normal mode, without any modification. However, in a compensating mode, the system shifts a frame of the image stored in the buffer according to the hand trembling motion, and the system selects the shifted frame from the stored image in the buffer, and the system finally magnifies and reproduces the selected frame.

The above-described method is disadvantageous in that degradation of the resolution occurs due to the magnification process, and this method requires a buffer having a large memory capacity.

FIG. 2 illustrates the conventional method of stabilizing the recorded image by using a large or high density charge coupled device(CCD). This method shifts an image frame on the CCD according to the hand-trembling. and selects the shifted image frame on the CCD, and reproduces the selected image. This method should use a large CCD or a CCD having high density so that the user can record the full image on the CCD without any loss of the image, in spite of the hand-trembling motion. As described above, the motions of images resulting from user hand-trembling is compensated by shifting the image frame on a buffer or a CCD according to the hand-trembling.

FIG. 3 illustrates the conventional method of stabilizing the recorded image by using a variable angle prism (also called as an active prism). This method controls the beam axis of the input beam with the active prism according to the hand trembling. The advantages of this method include fine resolution and wide compensation range. This is due to the fact that the method controls the beam axis mechanically, and does not have to magnify the selected image. However, this method has a certain disadvantage because the active prism is mechanically controlled. That is, if the user records the image with high magnification ratio or if the camcorder is moving or trembling with high speed when recording images, the resolution of the image will be greatly reduced since the active prism cannot change the beam axis of the input image mechanically according to the fast movement of the camcorder. Furthermore, the device is mechanically complex and expensive.

SUMMARY OF THE INVENTION

An object of the present invention is to provide an image stabilizing circuit for a camcorder capable of stabilizing unstable images, which are produced by hand-trembling or movement when a user is recording images with the camcorder.

Another object of the present invention is to provide an image stabilizing circuit using a buffer of small memory size and a small CCD compared to those of the prior art.

A further object of the present invention is to provide an image stabilizing circuit having improved resolution and improved accuracy.

In order to achieve the above-described objects, the image stabilizing circuit of the present invention comprises:

a charge coupled device for receiving light signals from objects, and for producing image signals corresponding to the light signals;

a first buffer for temporarily storing the image signals;

a motion detector for analyzing the image signals to detect motion of the image signals;

image shifting means for shifting a frame of an image stored in the first buffer according to an output of the motion detector, and for producing a shifted frame comprising a shifted portion of the image and a remaining portion with no image;

a second buffer for storing a previous image stored in the first buffer; and image adding means for adding the shifted portion of the image and a part of the previous image stored in the second buffer, wherein the image portion stored in the second buffer corresponds to the remaining portion of the shifted frame, and for thereby producing output images.

In accordance with another embodiment of the present invention, the image stabilizing circuit comprises:

a charge coupled device for receiving light signals from objects, and for producing image signals corresponding to the light signals;

a motion detector for analyzing the image signals to detect motion of the images;

image shifting means for shifting a frame of the image signals according to an output of the motion detector, and for producing a shifted frame comprising a shifted portion of the image signals and a remaining portion with no image;

a first buffer for storing an output image; and image adding means for adding the shifted portion of the image and a portion of the output image stored in the first buffer, wherein the portion stored in the first buffer corresponds to the remaining portion of the shifted frame, and for producing the output image.

In accordance with a further embodiment of this invention, the image stabilizing circuit comprises:

a charge coupled device for receiving light signals from objects, and for producing image signals corresponding to the light signals;

a motion detector for analyzing the image signals to detect motion of the images;

a high pass filter for filtering a low frequency from an output of the motion detector;

a low pass filter for filtering a high frequency from the output of the motion detector;

image shifting means for shifting a frame of the image signals according to an output of the high pass filter, and for producing a shifted frame comprising a shifted portion of the image signals and a remaining portion with no image;

a first buffer for shifting an output image according to an output of the low pass filter, and for storing a shifted output image; and image adding means for adding the shifted portion of the image and a portion of the output image stored in the first buffer, wherein the image portion corresponds to the remaining portion of the shifted frame, and for producing the output image.

BRIEF DESCRIPTION OF THE DRAWINGS

The features and advantages of the present invention may be better and more completely understood by studying the following detailed description of the presently preferred embodiments together with the appended drawings, of which.

DETAILED DESCRIPTION OF PREFERRED EMBODIMENTS

Preferred embodiments of the present invention are described below with references to the accompanying drawings. A first embodiment will be described with reference to FIGS. 4 and 5.

The stabilizing method according to the present invention stabilizes unstable images, which are produced by hand-trembling or movement when a user is recording images with the camcorder, for better resolution and better accuracy. In addition, the method uses a small field memory and a CCD of normal density as compared to those of the prior art. Basically, the circuit according to this invention shifts a frame of the input image (also called a target image) according to the user's hand-trembling. Then a remaining portion with no image will be produced by shifting the image frame. The remaining portion is compensated by adding an image of another image frame, which corresponds to the remaining portion. In other words, the corresponding image part of a previous image frame or a next image frame is added to the shifted image frame to compensate for the remaining part of no image to produce an output image.

If the camcorder is trembled or moved with a frequency higher than a field frequency of the image, the added image frame has a distortion on the border of the shifted frame and the added remaining part. The distortion results from the fact that the previous image frame does not have an image or information regarding the remaining part. However, the distortion of the edge parts can be ignored normally, since the information of the edge parts of an image frame is generally trivial.

Figure 1:
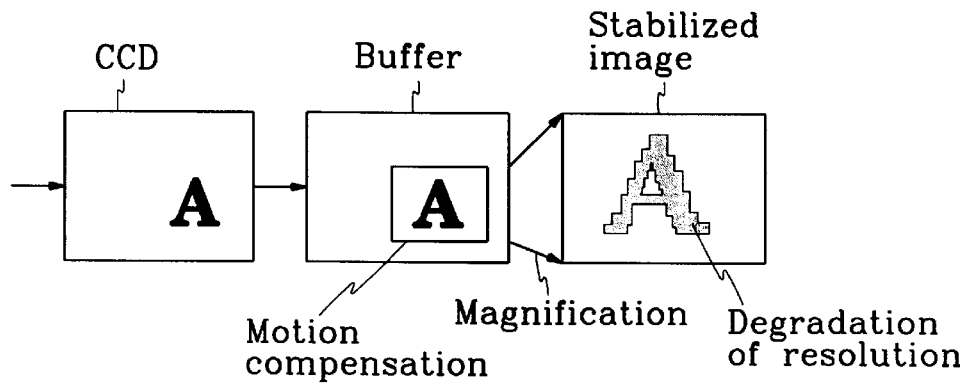
FIG. 1 illustrates a conventional method of stabilizing the recorded image by using a buffer having a large memory size.
Figure 2:
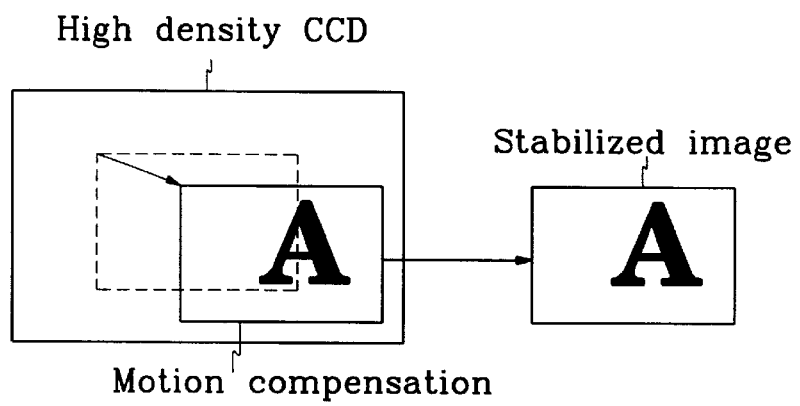
FIG. 2 illustrates a conventional method of stabilizing the recorded image by using a large CCD.
Figure 3:
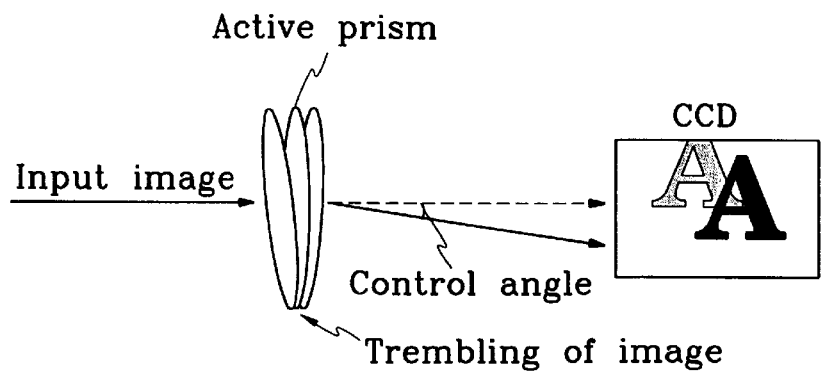
FIG. 3 illustrates a conventional method of stabilizing the recorded image by using a variable angle prism (also called an active prism)
Figure 4:
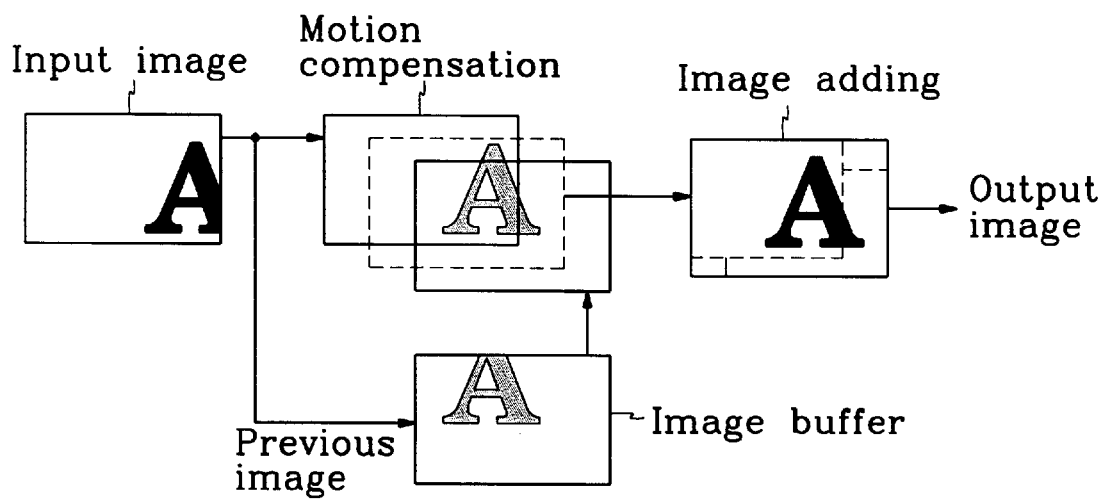
FIG. 4 illustrates a method of stabilizing the recorded image according to a first embodiment of the present invention.

As shown in FIG. 4, the input image is shifted according to the hand trembling during a motion compensation process. The shifted input image frame is shown as a dashed rectangle in FIG. 4. The hand trembling motion is detected by comparing the successive input images. By shifting the input image, a shifted frame comprising a shifted portion of the image and a remaining portion with no image is produced. That is, a remaining part of no image is produced on the right and bottom edges of the shifted image frame. Then, the remaining part is compensated by the selected part of the previous image frame stored in an image buffer. The previous image frame means an image which is stored in the image buffer shortly before the input image or target image is manipulated by the above described procedure.

Figure 5:
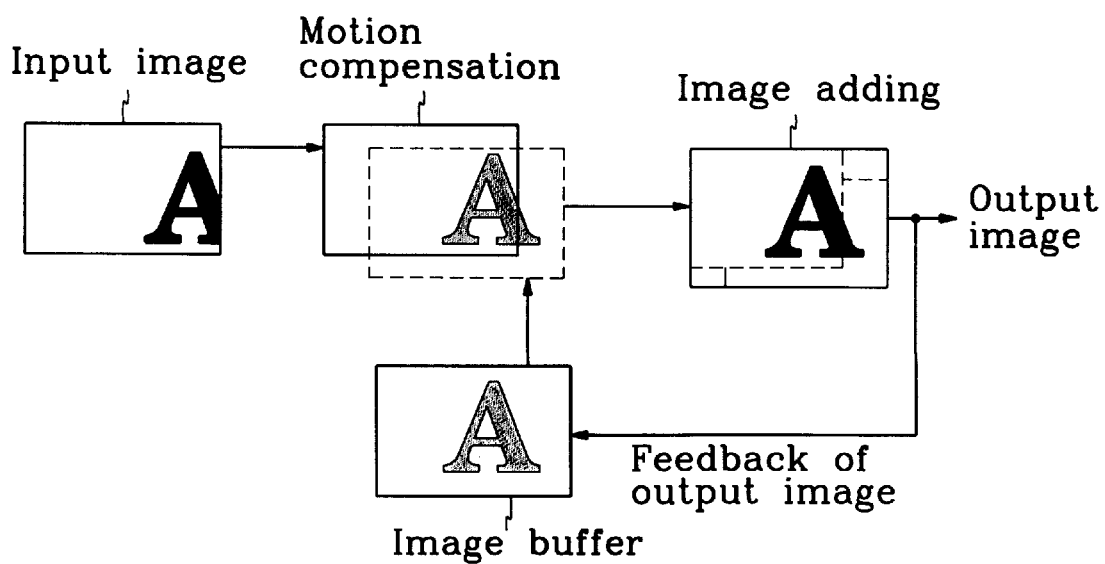
FIG. 5 illustrates a method of stabilizing the recorded image according to a second embodiment of the present invention.

As for FIG. 5, the image stabilizing procedure is the same as the procedure illustrated in FIG. 4. However, in this embodiment, the remaining part is compensated by the selected part of the output image frame stored in an image buffer.

In some cases, if a previous or an output image frame does not have an image or information regarding the remaining part, the remaining part cannot be compensated by a previous or an output image frame. The image of the remaining part can be produced and compensated by the zeroth interpolation of a neighboring pixel. This method may not reproduce the exact images, but the error is trivial in normal cases. As a result, a stabilized image can be produced by using a CCD of normal size and density, and by using a buffer having small memory size.

Figure 6:
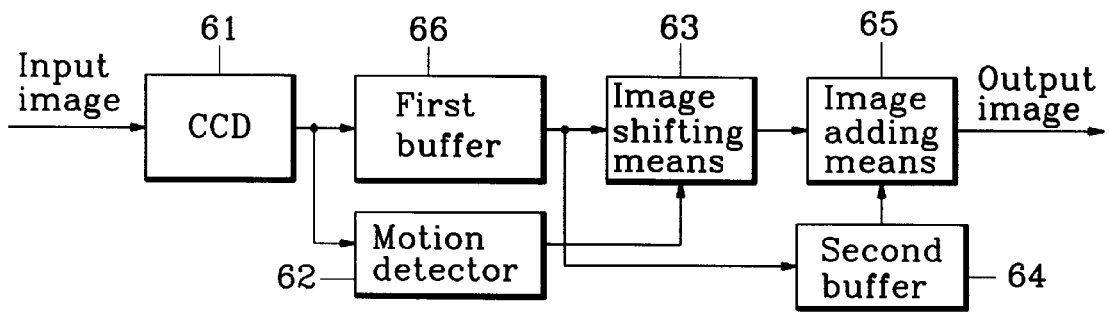
FIG. 6 is a block diagram of the image stabilizing circuit according to the first embodiment of the present invention.

FIG. 6 is a block diagram of the image stabilizing circuit according to the first embodiment of the invention. As shown in FIG. 6, the image stabilizing circuit comprises a CCD 61, a first buffer 66, a motion detector 62, an image shifting means 63, a second buffer 64 and an image adding means 65. The CCD 61 receives light signals from objects, and produces image signals corresponding to the light signals. The first buffer 66 temporarily stores the image signals for shifting the image signal. The motion detector 62 is provided for analyzing the input image signals to detect the trembling motion of the input image signals. The image shifting means 63 shifts a frame of the image signals stored in the first buffer 66 according to an output of the motion detector 62, and thereby produces a shifted frame comprising a shifted portion of the image and a remaining portion with no image. The second buffer 64 is provided for storing the previous image signals output from the first buffer 66. Finally, the image adding means 65 is provided for adding the shifted portion of the image and a portion of the previous image stored in the second buffer, wherein the portion stored in the second buffer corresponds to the remaining portion of the shifted frame, and for producing the output images.

Figure 7:
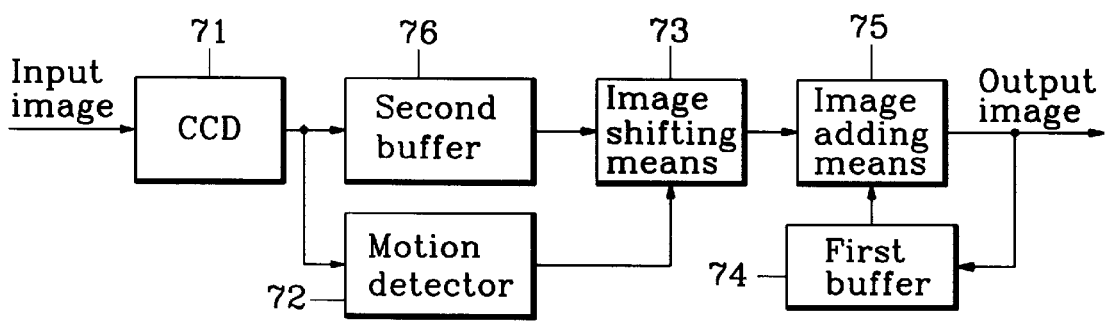
FIG. 7 is a block diagram of the image stabilizing circuit according to the second embodiment of the present invention.

FIG. 7 is a block diagram of the image stabilizing circuit according to the second embodiment of the invention which comprises a CCD 71, a motion detector 72, an image shifting means 73, a first buffer 74, a second buffer 76 and an image adding means 75. The CCD 71, the motion detector 72, the image shifting means 73 and the image adding means 75 perform the same function as the corresponding elements of the first embodiment. In the second embodiment, the first buffer 74 stores the output image signals which are produced by the image adding means 75, instead of the image signals of the second buffer 76. The output image stored in the first buffer is used in the compensation of the present frame. The function of the first buffer 74 is to provide the corresponding image of the output image frame to the remaining part of the input image frame which is produced by the shifting process of the image shifting means 73.

Figure 8:
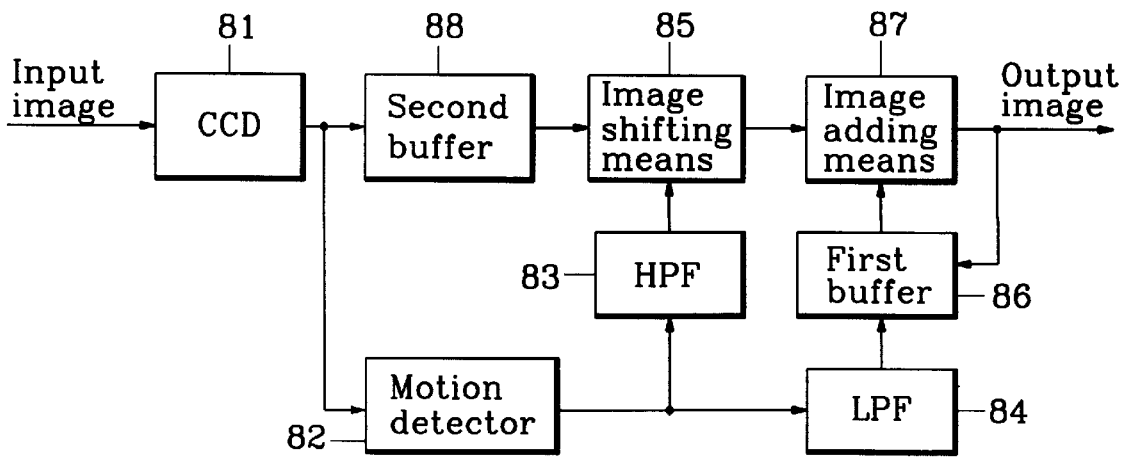
FIG. 8 is a block diagram of the image stabilizing circuit according to the third embodiment of the present invention.

FIG. 8 is a block diagram of the image stabilizing circuit according to the third embodiment of the invention. In this embodiment, circuit elements which distinguish unfavorable trembling of the camcorder from intentional movement of the camcorder, such as panning of camcorder, are provided. Generally, the unfavorable trembling movement of the camcorder is at a higher frequency than that of the intentional movement of the camcorder. Therefore, circuit elements to distinguish the frequencies of the movements are provided. The image stabilizing circuit comprises a CCD 81, a second buffer 88. a motion detector 82, a high pass filter (HPF) 83, a low pass filter (LPF) 84, an image shifting means 85, a first buffer 86 and an image adding means 87. The CCD 81, the second buffer 88, the motion detector 82 and the image adding means 87 perform the same function as the corresponding elements of second embodiment of the invention. The HPF 83 filters low frequency parts from the output of the motion detector 82, and produces the high frequency signals which represent the hand-trembling movement. The LPF 84 filters high frequency parts from the output of the motion detector 82, and produces the low frequency signals which represent the intentional movement of the camcorder. The image shifting means 85 is provided for shifting the input image signals of the second buffer 88 according to an output of the HPF 83. The first buffer 86 is provided for shifting output image signals according to an output of the LPF 84, and for storing the shifted output image signals.

The present invention can be applied to a camcorder, camera, etc to stabilize the output image. While the invention has been described in connection with what is presently considered to be the most practical and preferred embodiment. it is to be understood that the invention is not be limited to the disclosed embodiment.

While the invention has been described in detail and with reference to specific embodiments, it will be apparent to one skilled in the art that various modifications can be made without departing from the spirit and scope of the invention.

What is claimed is:

1. A video camera system having an image stabilizing circuit, comprising:
    a charge coupled device for receiving light signals from objects, and for producing first image signals corresponding to the light signals;
    a first buffer for temporarily storing said first image signals;
    a motion detector for receiving said first image signals and for analyzing said first image signals with second image signals previously output from said charge coupled device. to detect motion between images represented by said first and said second image signals;
    image shifting means for shifting a frame of said first image signals stored in said first buffer according to an output of said motion detector, and producing a shifted frame comprising a shifted portion of said image signals and a remaining portion having no image;
    a second buffer for storing a previous image stored in said first buffer; and
    image adding means for adding said shifted portion of said image signals of said shifted frame and a part of said previous image stored in said second buffer, wherein said part of said previous image stored in said second buffer replaces said remaining portion of said shifted frame having no image, said image adding means outputting output image.

2. The video camera system according to claim 1, wherein said second buffer stores image signals of a present frame for inputting to said image adding means wherein said part of said image signals of said present frame are added to said remaining portion of said shifted frame of a next image frame.

3. A video camera system having an image stabilizing circuit comprising:
    a charge coupled device for receiving light signals from objects, and for producing first image signals corresponding to said light signals;
    a motion detector for receiving said first image signals and for analyzing said first image signals with second image signals previously output from said charge coupled device to detect motion between images represented by said first and said second images signals;
    image shifting means for shifting a frame of said first image signals according to an output from said motion detector, and producing a shifted frame comprising a shifted portion of said image signals and a remaining portion having no image;
    a first buffer for storing an output image; and
    image adding means for adding said shifted portion of said image signals of said shifted frame and a part of said output image stored in said first buffer, wherein said part of said output image replaces said remaining portion of said shifted frame having no image, said image adding means outputting a stabilized output image.

4. The video camera system according to claim 3, further comprising a second buffer for storing said first image signals and supplying said image signals to said image shifting means.

5. A video camera system having an image stabilizing circuit comprising:
    a charge coupled device for receiving light signals from objects, and for producing first image signals corresponding to said light signals;
    a motion detector for receiving said first image signals and for analyzing said first image signals with second image signals previously output from said charge coupled device to detect motion between images represented by said first and second image signals;
    a hand trembling motion detector for filtering a low frequency part from an output of said motion detector for detecting hand-trembling motion;
    a panning motion detector for filtering a high frequency part from said output of said motion detector for detecting a panning motion;
    image shifting means for shifting a frame of said first image signals according to an output of said hand trembling motion detector, and producing a shifted frame comprising a shifted portion of said image signals and a remaining portion having no image;

a first buffer for shifting an output image according to an output of said panning motion detector, and for storing said shifted output image; and image adding means for adding said shifted portion of said image signals of said shifted frame and a part of said output image stored in said first buffer, wherein said part of output image replaces said remaining portion having no image, said image adding means outputting a stabilized output image.

6. The video camera system according to claim 3, wherein said first buffer stores said output image for inputting to said image adding means wherein said part of said output image stored in said first buffer is added to said remaining portion of said shifted frame.

7. The video camera system according to claim 5, further comprising a second buffer for storing said first image signals and supplying said first image signals to said image shifting means.

8. The video camera system according to claim 5, wherein said first buffer stores said output image and said part of said output image stored in said first buffer is added to said remaining portion of said shifted frame having no image.

9. A method for stabilizing a video input image, comprising the steps of:

(a) receiving first image signals from an input device;

(b) storing image signals of a first buffer into a second buffer;

(c) storing said first image signals from said input device into said first buffer;

(d) comparing said first image signals received from said input device with previously received second image signals from said input device, to detect motion differences between said first and said second image signals, and outputting a motion signal corresponding to said motion differences;

(e) shifting said first image signals in said first buffer according to said motion signal, thereby creating a shifted frame having a shifted portion comprising said first image signals of said first buffer and a remaining portion of said shifted frame having no image; and (f) image adding said shifted portion of said first buffer having said first image signals with a section of said second buffer corresponding to said portion of said first buffer having no image, thereby creating a stabilized output image.

10. A video camera system having an image stabilizing circuit, comprising:

a charge coupled device for receiving light signals from objects, and for producing first image signals corresponding to the light signals;

a first buffer for temporarily storing said first image signals;

a motion detector for receiving said first image signals and for analyzing said first image signals with second image signals previously output from said charge coupled device, to detect motion between images represented by said first and said second image signals;

an image shifter for shifting a frame of said first image signals stored in said first buffer according to an output of said motion detector, and producing a shifted frame comprising a shifted portion of said image signals and a remaining portion having no image;

a second buffer for storing a previous image stored in said first buffer; and an image adder for adding said shifted portion of said image signals of said shifted frame and a part of said previous image stored in said second buffer, wherein said part of said previous image stored in said second buffer replaces said remaining portion of said shifted frame having no image, said image adding means outputting an output image.

11. A video camera system having an image stabilizing circuit comprising:

a charge coupled device for receiving light signals from objects, and for producing first image signals corresponding to said light signals;

a motion detector for receiving said first image signals and for analyzing said first image signals with second image signals previously output from said charge coupled device, to detect motion between images represented by said first and said second image signals;

an image shifter for shifting a frame of said first image signals according to an output from said motion detector, and producing a shifted frame comprising a shifted portion of said image signals and a remaining portion having no image;

a first buffer for storing an output image; and an image adder for adding said shifted portion of said image signals of said shifted frame and a part of said output image stored in said first buffer, wherein said part of said output image replaces said remaining portion of said shifted frame having no image, said image adding means outputting a stabilized output image.

12. A video camera system having an image stabilizing circuit comprising:

a charge coupled device for receiving light signals from objects, and for producing first image signals corresponding to said light signals;

a motion detector for receiving said first image signals and for analyzing said first image signals with second image signals previously output from said charge coupled device, to detect motion between images represented by said first and said second image signals;

a hand trembling motion detector for filtering a low frequency part from an output of said motion detector for detecting hand-trembling motion;

a panning motion detector for filtering a high frequency part from said output of said motion detector for detecting a panning motion;

an image shifter for shifting a frame of said first image signals according to an output of said hand trembling motion detector, and producing a shifted frame comprising a shifted portion of said image signals and a remaining portion having no image;

a first buffer for shifting an output image according to an output of said panning motion detector, and for storing said shifted output image; and an image adder for adding said shifted portion of said image signals of said shifted frame and a part of said output image stored in said first buffer, wherein said part of output image replaces said remaining portion having no image, said image adding means outputting a stabilized output image.

* * * * *